Sept. 24, 1935.  R. M. PLANCK  2,015,191
CONTROL FOR COUPLING DEVICES
Filed Aug. 15, 1931
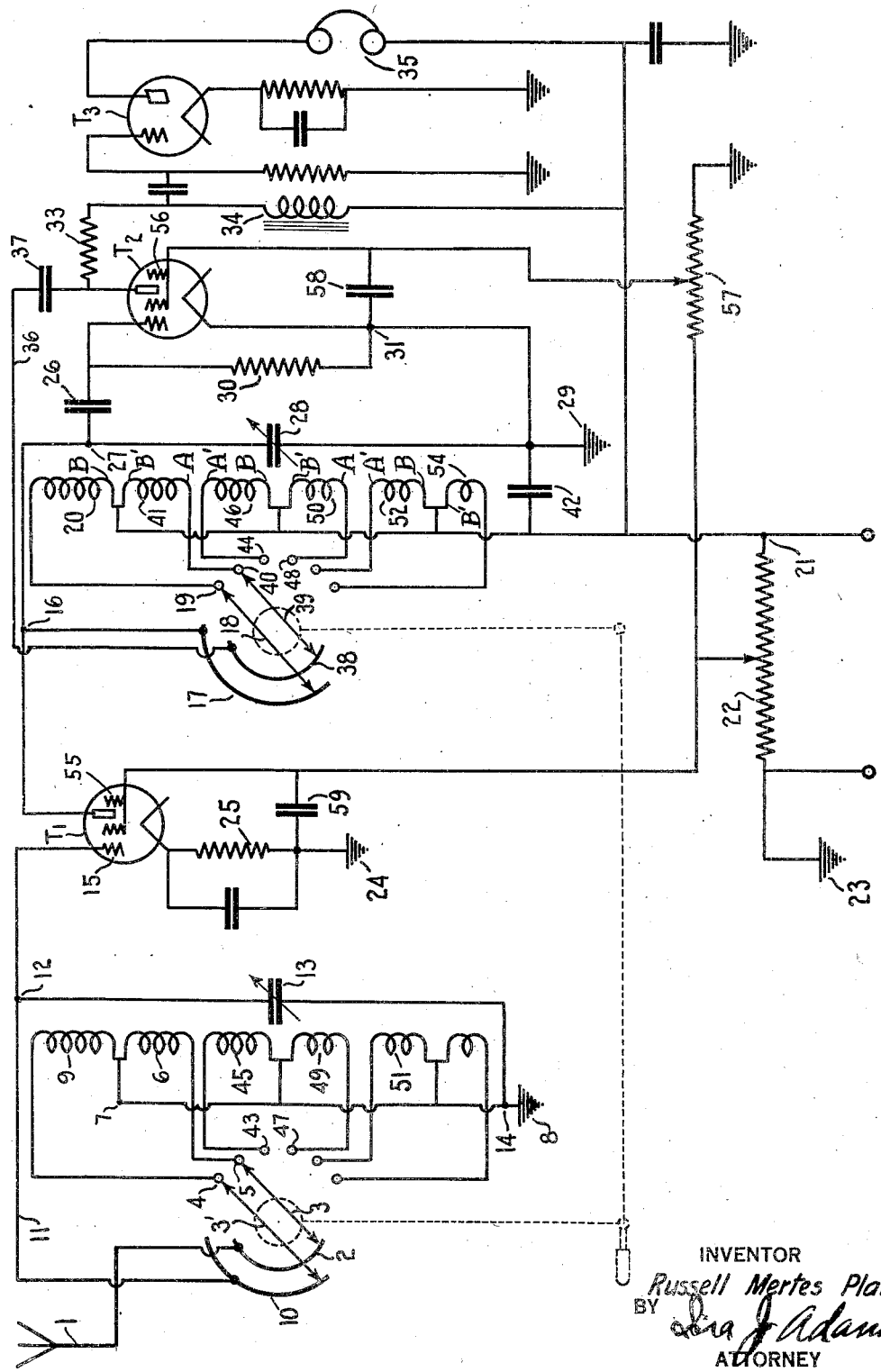
INVENTOR
Russell Mertes Planck
BY
ATTORNEY Patented Sept. 24, 1935

2,015,191

UNITED STATES PATENT OFFICE 2,015,191

CONTROL FOR COUPLING DEVICES

Russell Mertes Planck, Jackson, Mich., assignor, by mesne assignments, to Radio Corporation of America, New York, N. Y., a corporation of Delaware Application August 15, 1931, Serial No. 557,312

13 Claims. (Cl. 250—20)

This invention relates to control systems for electrical circuits and is illustrated in connection with a radio frequency receiving set although it will be useful in other connections.

One of the objects of the invention is to construct a control device with a minimum number of coupling coils.

Another object of the invention is to construct a series of coils so that alternate coils are coupled to adjacent coils with means for connecting a supply and a work circuit alternately to adjacent coils arranged in succession.

Another object of the invention is to arrange a series of coils so that the coils may be successively used as a plate coupling coil and the adjacent coil used as a tickler coil.

Still another object of the invention is to construct a series of coils so that one of the coils may be used as a primary coil and the adjacent coil used as a secondary coil, the coils being alternately used as primaries and secondaries as the adjustment is made.

Other objects of the invention will appear in the following description, reference being had to the drawing, in which the single figure represents a diagrammatic arrangement for accomplishing the purposes of the invention. The diagrammatic illustration will be readily understood by describing the method of operation without a detailed description of the circuits. To minimize the length of description this method of procedure will be followed after which the remaining parts of the system not referred to in the method of operation will be briefly referred to.

The signal striking the antenna 1 is led to contact 2 with which engages the arm 3. The opposite end of the arm 3 contacts with point 5 in the position shown and the antenna currents thence pass through the coil 6 to junction point 7 and thence to ground 8. This induces current in coil 9, which current passes from the point 7 through coil 9 to contact 4, switch arm 3', contact 10, conductor 11 to the point 12 through variable tuning condenser 13 to point 14 and thence back to the point 7. The grid 15 of the four element tube $T_1$, shown by way of example, receives the potential in this secondary circuit since it is connected to junction point 12. Current is induced in the plate circuit and the flow is from the plate of tube $T_1$, to the point 16 and thence to contact 17, switch arm 18, point 19, coupling inductance 20, to the high potential end 21 of the power supply resistance 22, thence to grounds 23, 24, resistance 25, to the filament of the tube back to the plate. The detector tube $T_2$ has its grid connected to stopping condenser 26 to the point 27 and thence to point 16. The variable tuning condenser 28 is tapped from the point 27 to ground 29, being thus in parallel with the inductance 20. The grid of the detector tube $T_2$ therefore receives the radio frequency potential appearing in the coupling coil 20 but direct current potential is kept off of the grid by the stopping condenser. The detector action is accomplished in this case by means of a grid leak 30 tapped from the grid to the point 31 in the filament circuit of the detector tube, this point also being connected to ground 29. The plate of the detector tube is connected to a resistance 33 and coupling coil 34 to the high potential end 21 of the power supply resistance 22. The amplifier tube $T_3$ has its grid coupled to a stopping condenser to the high potential end of the coil 34 and amplified signals will be received in the telephone or other indicator 35 in a well understood way.

The plate of the detector tube is also coupled through conductor 36 and condenser 37 to contact 38. This contact is connected through arm 39 to point 40, tickler coil 41, to condenser 42 and thence back to the filament of the detector tube through point 31. Coils 20 and 41 like coils 9 and 6 are arranged to have magnetic coupling with each other. These coils produce a feedback from the plate to the grid of tube $T_2$. By varying the resistance 57 connected to conductor 56 the tube may be made either to regenerate or oscillate, whichever is desired. As thus far described, the circuit and operation is of the usual type. If one desires to receive a signal of different frequency the switch arms 3', 3, 18 and 39 are moved one step clockwise until arms 3' and 3 contact with contact points 5 and 43, and arms 18 and 39 contact with contact points 40 and 44. This will make coil 6 the primary of the antenna coupler and coil 45 the secondary of such coupler, while coil 41 will be the plate inductance coupling coil and coil 46 the tickler coil in the plate circuit of tube $T_2$. By this adjustment I have discarded one coil only in each of the circuits, namely coils 9 and 20.

If a signal of still another frequency is desired, arms 3' and 3 will be moved on to contacts 43 and 47 and arms 18 and 39 on contact points 44 and 48 respectively. This will make coil 45 the primary in the antenna coupler and coil 49 the secondary. Also coil 46 now becomes the plate inductance coupler and coil 50 the tickler coil. For a still further variation in tuning the arms 3' and 3 will be moved to make the coil 49 the antenna primary and the coil 51 the secondary.

Likewise the coil 50 will become the plate coupling coil and coil 52 becomes the plate coupling inductance and coil 54 the tickler coil. In the arrangement shown this will be the last adjustment that can be made but if further adjustments are needed additional coils may be used and arranged in the same way. The details of the circuit are not necessary for use of the invention but they are given in order to disclose a complete arrangement.

The screen grid 55 of the tubes $T_1$ are connected to an intermediate point in the power supply resistance 22 and the screen grid 56 is connected to a point on the resistance 57 which is also joined to the contact point in the resistance 22. By this means the screen grid 56 may be given a lesser potential than the screen grid 55. The screen grids of both tubes are connected by appropriate condensers 58, 59 to the filament circuit.

The source of filament supply may be of any sort and since this forms no part of the invention it is not shown.

The selector switch arms 3' and 3 may be interconnected with the switch arms 18 and 39 so that they may move in unison as indicated diagrammatically.

The coils making up the inductance of the selector switches may each be wound continuously on some form such as an insulating tube and the turns tapped off, as shown. This minimizes the cost of these inductor coils and therefore one avoids the expense of making separate coils. As heretofore made, adjusting coils of this sort have either been arranged so that two coils are thrown out after each variable step or else coils are plugged into sockets, two new coils for each step. In my arrangement it will thus be seen that the adjacent ends A A' are connected to switch contacts and the adjacent ends B B' alternating therewith are connected together and to the source of supply at the point 21. By positioning the coils and connecting the alternate adjacent ends in the way shown I have eliminated the expense incident to providing a large number of coils and have simplified the tuning arrangement which requires merely a shifting of the control lever one step at a time to receive various signal frequencies. The coils 9, 6, 45, 49, 51 are similarly arranged except one series of alternate adjacent ends is connected to ground instead of to a source of supply.

While I have shown my invention as applied to a coupling coil in an antenna circuit and an inductance coil with a coupled tickler in an interstage arrangement, the invention is not limited to this use. It may be used in any transformer arrangement or in any coupling system where a plurality of coils are to be used.

Various modifications of the arrangement may be devised without departing from the spirit of the invention. Only one arrangement is shown as this is sufficient to adequately disclose the invention.

Having described my invention, what I claim is:

1. In radio sets, a vacuum tube having an input and an output circuit, a series of coils, each one of which is coupled to the next succeeding coil of the series, and switch means for connecting the input circuit to each of said coils in rotation and for connecting the output circuit through an adjacent coupled coil as a feed back between said circuits.

2. In radio sets, a series of coils, each one of which is coupled to the next succeeding coil of the series, a tuning condenser and means adapted to connect said coils successively to said condenser as a frequency selecting circuit, and simultaneously to connect an adjacent coupled coil to act as a primary for energy transfer in respect to the other coil.

3. In transformers, a series of coils, each one of which is coupled to the next succeeding coil of the series, a supply circuit, a work circuit, and means to connect the coils successively to said supply circuit as the primary of a transformer and an adjacent coupled coil to the work circuit as the secondary of the transformer.

4. In transformers, a series of coils, each one of which is coupled to the next succeeding coil of the series, a vacuum tube having a control electrode and anode, a tuning condenser, and means for connecting the control electrode to each of said coils in succession with the condenser in shunt thereto and an adjacent coupled coil to the anode.

5. In radio sets, a series of coils, each coil of which is coupled to the next succeeding coil of the series, each having different impedance from the other coils, a pair of stages of vacuum tubes having control electrodes and anodes, means for jointly connecting the anode of one tube and the control electrode of the other through said coils successively and magnetically coupling the anode of said other tube with its own control electrode through the coil thus connected to the first anode and an adjacent coil coupled thereto and a source of current supply connected to each of said coils.

6. In electrical circuits, a series of coils positioned end to end for magnetic coupling between adjacent ends, a voltage supply connected to one end of each coil, a pair of switch members, and means whereby said switch members may be moved to contact successively with the remaining ends of each pair of adjacent coils in the series.

7. In electrical circuits, a series of coils positioned end to end, a voltage supply connected to alternate adjacent ends, spaced contacts connected to the remaining ends, a pair of switch blades adapted to be moved to contact with adjacent pairs of contacts throughout the series.

8. In electrical circuits, a series of coils positioned end to end for magnetic coupling between adjacent ends, a voltage supply connected to the middle of each coil, a series of spaced contacts, the ends of said coils being connected consecutively to said contacts, and a pair of switch blades adapted to be moved to contact with adjacent pairs of contacts throughout the series.

9. In radio sets, a series of coils positioned end to end for magnetic coupling between adjacent coils, a voltage supply connected to alternate adjacent ends, spaced contacts connected to the remaining ends, a pair of switch blades adapted to be moved to contact with adjacent pairs of contacts throughout the series, a vacuum tube having an anode and a control electrode, said anode having connections to one switch blade and said control electrode being connected to the other blade.

10. In radio sets, a series of coils positioned end to end for magnetic coupling between adjacent coils, a voltage supply connected to alternate adjacent ends, spaced contacts connected to the remaining ends, a pair of switch blades adapted to be moved to contact with adjacent pairs of contacts throughout the series, a pair of vacuum tubes having anodes and control electrodes connections joining, the anode of one tube and the control electrode of the other with one of said switch blades and connections joining the anode of said other tube with the other of said switch blades.

11. In transformers, a series of coils positioned end to end for magnetic coupling between adjacent ends, a common connection to alternate adjacent ends, spaced contacts connected to the remaining ends, a pair of switch members adapted to be moved to engage adjacent pairs of contacts throughout the series, and separate primary and secondary mains connected to said switch members.

12. In radio sets, a series of coils, each one of which is coupled to the next succeeding coil of the series, a pair of switches, means to connect alternate ends of said coils with said switches, a pair of vacuum tubes having control electrodes and anodes, connections between the anode of one tube and one of said switches, and connections between the control electrode of the other tube and the other switch whereby in successive positions of said switches the coils are successively placed in the anode circuit of the one tube and an adjacent one of said series of coils in each position is placed in the control electrode circuit of the other tube, a source of current supply and means to connect the source of supply to the remaining ends of said coils.

13. A series of $n$ coils positioned to be coupled together in succession, a pair of switch arms, $n$ contacts adapted to be engaged successively by said switch arms, a common input and output conductor, one end of each of said coils being connected together and to said conductor, each of the other ends being connected to one of said contacts, an input conductor connected to one of said switch arms and an output conductor connected to the other of said switch arms whereby on movement of said arms over said contacts $n-1$ combinations of said coils in the output and input circuits may be obtained.

RUSSELL MERTES PLANCK.

CERTIFICATE OF CORRECTION.

Patent No. 2,015,191. September 24, 1935.

RUSSELL MERTES PLANCK.

It is hereby certified that error appears in the printed specification of the above numbered patent requiring correction as follows: Page 2, second column, line 64, claim 9, for the words "being connected" read having connections; and that the said Letters Patent should be read with this correction therein that the same may conform to the record of the case in the Patent Office.

Signed and sealed this 12th day of November, A. D. 1935.

Leslie Frazer (Seal) Acting Commissioner of Patents.